June 28, 1966   C. F. AUGUSTINE ETAL   3,258,688
MICROWAVE THICKNESS MEASURING APPARATUS
Filed July 12, 1962
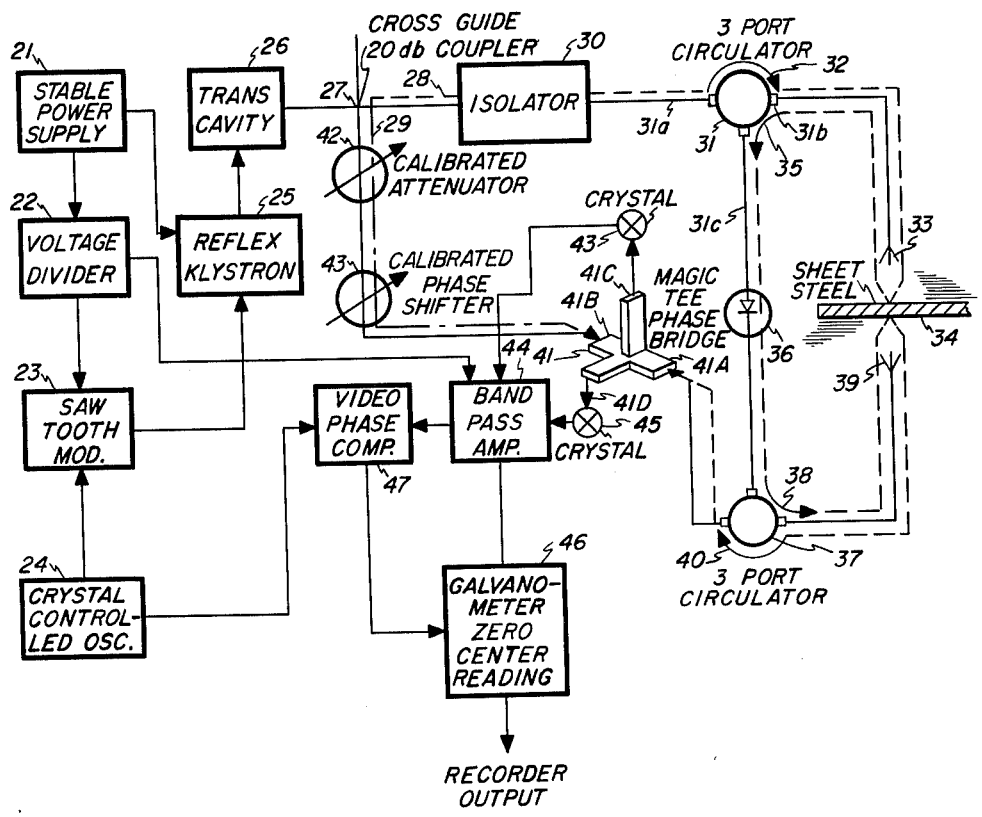
INVENTORS
CARROLL F. AUGUSTINE
ANGELO L. MERLO
BY
*Richard J. Seeger*
ATTORNEY United States Patent Office 3,258,688
Patented June 28, 1966

3,258,688
MICROWAVE THICKNESS MEASURING
APPARATUS
Carroll F. Augustine, Farmington, and Angelo L. Merlo, Troy, Mich., assignors to The Bendix Corporation, Southfield, Mich., a corporation of Delaware
Filed July 12, 1962, Ser. No. 209,475
4 Claims. (Cl. 324—58.5)

This invention pertains to a microwave interferometer and more particularly for an interferometer for measuring the thickness of a continually moving object, such as sheet steel coming from a rolling operation, with a very high degree of accuracy.

A problem confronting the art has been to measure accurately the thickness of moving parts, especially of sheet steel coming off a rolling mill, which has a high degree of flutter. It is very desirable to know the thickness of the sheet steel to within .1 mil, but due to the extreme flutter and heat of the material, such measurements have proven very difficult to obtain.

It is an essential object of this invention to solve this problem by directing in a continuous path a microwave beam that is reflected off opposite sides of the material or object to be measured so that the path of the microwave beam has the same length for a given thickness of the object regardless of the movement of the object. This "double reflection" path is then compared with a reference path of predetermined length emanating from the high frequency source which generates the microwave beam, and by comparison techniques, the change in material thickness from a preset value may be accurately obtained.

It is an object of this invention to embody the concept above described in a device having a pair of antennas which are facing each other and spaced a predetermined distance apart, with each antenna connected to a three port circulator. The object to be measured is then placed or caused to pass between the opposed antennas.

A portion of a high frequency signal source is sent to one of the circulators which directs this signal through its antenna to the object. The reflection from the object is received by the antenna and sent by the circulator to a second circulator where the signal is directed to the second antenna to the opposite side of the object.

This second reflection is sent to a phase comparator and is compared with a second portion of the high frequency signal. This second portion passes through a predetermined path length, which is adjustable. By knowing the frequency of the signals and the phase difference between the double reflected signal and the predetermined reference path length signal, the change in path length of the double reflected signal may be determined. This change is directly related to the thickness of the object.

The object to be measured can move towards either antenna and the double reflected path length will remain the same for the same object thickness.

Also, a high frequency source, such as a klystron, generates the frequencies used in this invention and a cavity resonator is coupled to the output of the klystron to stabilize its frequency. This solves a problem that had existed in the art in a very simple manner.

These and other objects and advantages will become more apparent when a preferred embodiment is considered in connection with the drawing which shows a block diagram of microwave interferometer of this invention.

Shown in the drawing is a power supply 21 which supplies voltages to the voltage divider 22 which in turn supplies low stable voltages to the saw tooth modulator 23 and amplifier 44.

The direct current from divider 22 is sent to a saw tooth modulator 23 which forms a saw tooth voltage, the frequency of which is controlled by crystal oscillator 24.

The output of modulator 23 is sent to reflex klystron 25, which also receives power from power supply 21, and emits a very high frequency, in the order of 35,000 mc.p.s The high frequency output of klystron 25 is sent to cavity resonator 26 which emits at very small intervals, such as every 10 microseconds, a sharp peak of the frequency for which the resonator 26 is tuned and which may be 35,000 megacycles per second. This frequency is very stable due to the cavity resonator 26 which only passes the frequency for which it is designed.

*Double reflection path*

The signal from resonator 26 goes to cross guide 20 db coupler 27 where about 99 percent of the signal is directed to the "double reflection" circuit as shown by dashed line 28, and about 1 percent of the signal is directed to the phase comparator which path is shown by dash-dot reference signal path 29. In path 29 is isolator 30 which is used to prevent energy from traveling back to the source or coupler 27.

The signal from isolator 30 goes to three port circulator 31, such as is disclosed in United States Patent 3,165,711 issued January 12, 1965 to Oliver L. Drumheller and Ronald W. Kordos, wherein the signal is directed as shown by arrow 32 to antenna 33. Antenna 33 then directs this signal to one side of the object to be measured, which in this instance is sheet steel 34 coming from a rolling mill, not shown. The travel of sheet 34 is perpendicular to the plane of the drawing and has a vertical vibration or flutter as it comes off the mill. The reflection from sheet 34 is received by antenna 33 and directed back to circulator 31. The reflected signal received by antenna 33 is then sent to a second three port circulator 37, which is similar to circulator 31, and directs all signals coming from circulator 31 along the direction of arrow 38 towards a second antenna 39 which directs this signal to the opposite side of the member to be measured, which in this case in steel sheet 34.

The reflection from steel sheet 34 is then received by antenna 39 and sent to circulator 37 which directs all energy coming from antenna 39 along arrow 40 to arm 41A of magic tee 41.

*Reference signal path*

The reference signal path 29 coming from coupler 27 is sent through calibrated attenuator 42 and calibrated phase shifter 43 and then to the second arm 41B of magic tee 41. Attenuator 42 and phase shifter 43 are adjusted until the instrument is calibrated for a particular use. For example, if the interferometer is used to indicate any divergence in dimension of the material passing between antennas 33 and 39 from a given dimension, attenuator 42 and phase shifter 43 are adjusted until a zero reading is obtained for this given dimension.

Phase comparing circuit

Due to the characteristics of the magic tee 41, the sum of the double reflected signal 28 (arm 41A) and of reference signal 29 (arm 41B) is formed in arm 41C, and microwave video detected by crystal 43 and passed to bandpass amplifier 44. Bandpass amplifier 44 is a narrow band amplifier which amplifies only the frequency generated by the crystal oscillator 24. By using this narrow band amplifier a higher gain out of $1/f$ noise is achieved. The difference of the signals in paths 28 and 29 is formed in arm 41D of magic tee 41 and is microwave video detected by crystal 45 and also passed to amplifier 44. By combining the sum and difference of the reference signal and double reflection signal in amplifier 44, certain noise factors cancel out and the linear portions of the phase-object displacement relation are increased, as explained in copending application entitled "Displacement Detector" Serial No. 833,267, now Patent No. 3,119,103, filed August 12, 1959 by Carroll F. Augustine.

The output of bandpass amplifier 44 is sent to galvanometer 46 which has a zero center reading. In order to indicate whether the output from magic tee 41 is plus or minus from the desired dimension, bandpass amplifier also sends a signal to video phase comparator 47. If the error signal is plus from magic tee 41, the phase will be 180° different than the minus error signal and phase comparator 47 is able to determine this phase difference since it receives a reference phase signal from oscillator 24. If the error is minus, then the comparator will send a signal to galvanometer 46 to swing the indicator to the left of the zero center reading and if the error is plus, the comparator 47 will send a signal to galvanometer 46 to cause the needle to swing to the right of the zero center reading by the amount of the error.

Operation

In the operation of this device, the first step is to calibrate the meters 42, 43 for the desired thickness of sheet steel. This is done by placing a steel sheet between antennas 33 and 39 that has the thickness dimension which is desired. Phase shifter 43 is then adjusted until the reading on galvanometer 46 is zero. After this, any deviation of the steel sheet thickness passing between antennas 33 and 39 will cause a plus or minus reading on meter 46.

Regardless of the vertical movement of sheet 34 between antennas 33 and 39, the reading on galvanometer 46 will indicate the thickness of the sheet. The length of path 28 as compared to the adjusted reference path 29 becomes the reading on meter 46 and this length of path 28 is determined only by the thickness of steel sheet 34 and not by the position of the sheet between antennas 33 and 39. This is true because as the sheet moves toward antenna 33, the path 28 between the sheet and antenna 33 becomes smaller, but at the same time the path 28 between sheet 34 and antenna 39 becomes an equal amount larger. Therefore, regardless of the flutter or movement of sheet 34, its thickness will be accurately measured on meter 46.

Also, as sheet 34 moves closer to one antenna, thereby making the reflections stronger in that antenna, it moves by an equal amount away from the opposite antenna, making that reflection weaker so that the total strength of the double reflected signal remains essentially constant.

Although this invention has been disclosed and illustrated with reference to particular applications, the principles involved are susceptible of numerous other applications which will be apparent to persons skilled in the art. The invention is, therefore to be limited only as indicated by the scope of the appended claims.

Having thus described our invention, we claim:

1. Microwave interferometer for measuring object thickness comprising
   phase comparing means
   a high frequency wave generating source sending a portion of its output to said phase comparing means,
   a first antenna means spaced from and directed towards one side of the object,
   second antenna means spaced from and directed towards the side opposite said one side,
   means to direct a portion of the output of said high frequency wave generating source to said first antenna means and direct the reflection from said object received by said first antenna means to said second antenna means and direct the reflection received by said second antenna means to said phase comparing means,
   said phase comparing means comparing the phase of the reference signals from said high frequency source and said reflection received by said second antenna means and indicating the presence and amount of any phase difference.

2. Microwave interferometer for measuring object thickness comprising
   phase comparing means
   a high frequency wave generating source sending a portion of its output to said phase comparing means for a reference signal,
   a first energy directing means
   a first antenna means directed toward one side of said object
   a second energy directing means
   a second antenna means being spaced from and opposed to said first antenna means and directed to the side opposite said one side of said object
   said first energy directing means directing energy from said high frequency source to said first antenna means and directing reflected energy received by said first antenna means to said second energy directing means,
   said second energy directing means directing energy from said first antenna means to said second antenna means and directing reflected energy received by said second antenna means to said phase comparing means,
   said phase comparing means comparing the phase of the signal from said high frequency wave generating source and from said second antenna means to determine the thickness of said object.

3. The interferometer of claim 2 where said phase comparing means comprises a magic tee, said generating source entering one arm of said magic tee, said signal from said second antenna entering a second arm of said magic tee, the sum of said signal being formed in the third arm of said magic tee and the difference of said signals being formed in the fourth arm of said magic tee,
   indicating means for receiving said sum and said difference and indicating the phase difference of said antenna reference signal and said signal from said second antenna.

4. Apparatus for measuring the thickness of an object comprising
   means for generating a high frequency wave,
   means for directing a first portion of said wave along a reference path,
   means for directing a second portion of the high frequency wave generating output in a continuous path which is reflected off opposite sides of the object the thickness of which is to be measured,
   means for phase comparing said first and second portions to determine the path length of said second portion and hence the object thickness, means for sweeping the frequency of said means for generating a high frequency wave, a cavity resonator means connected to the output of said means for generating a high frequency to pass only the frequency for which said resonator is designed, stable frequency means for controlling the frequency of said means for sweeping the frequency, second phase comparing means for comparing the phase of said stable frequency means with the phase of the output of said means for comparing phase to determine the sign of the output signal.

References Cited by the Examiner
UNITED STATES PATENTS

| | | | |
|---|---|---|---|
| 2,580,968 | 1/1952 | Sproull | 324—81 X |
| 2,640,190 | 5/1953 | Rines. | |
| 2,671,884 | 3/1954 | Zaleski. | |
| 2,952,296 | 9/1960 | Kofoid | 324—84 X |
| 3,117,276 | 1/1964 | Beyer et al. | 324—58.5 |

WALTER L. CARLSON, *Primary Examiner.*

FREDERICK M. STRADER, *Examiner.*

A. E. RICHMOND, *Assistant Examiner.*